United States Patent Office 3,150,799
Patented Sept. 29, 1964

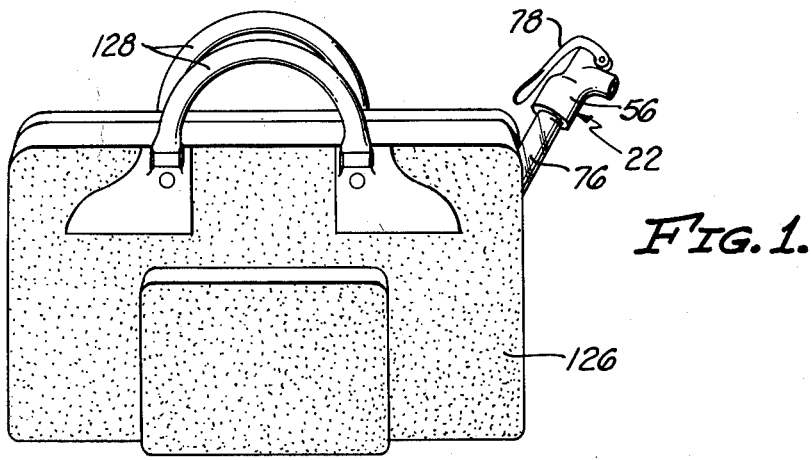
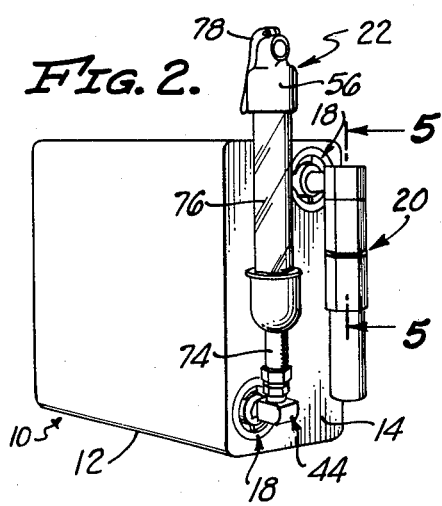
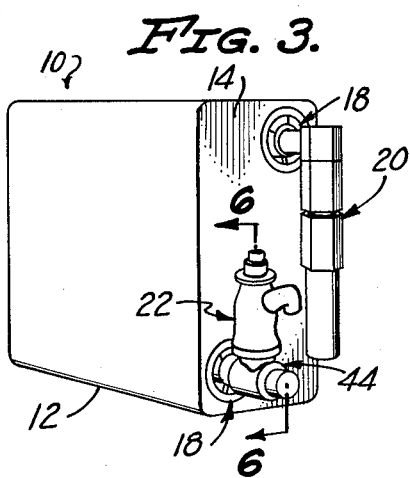
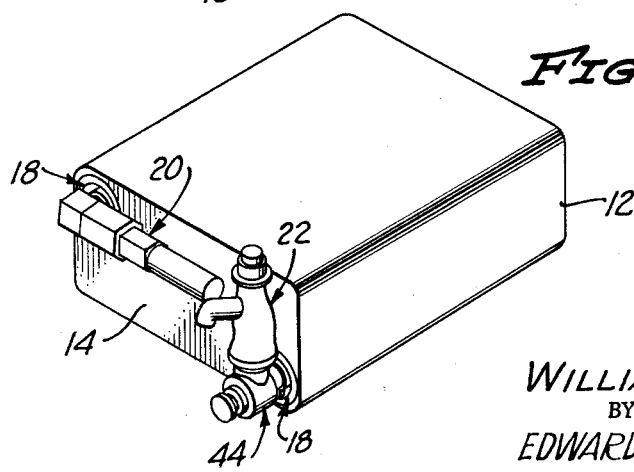

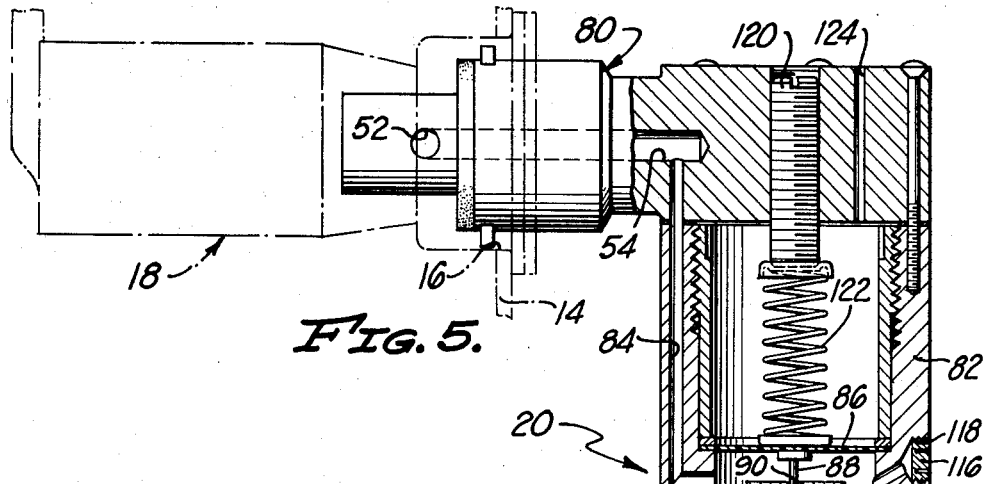
FIG. 5.
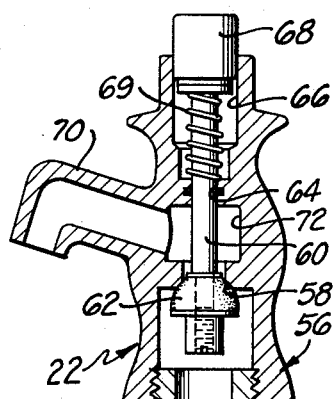
FIG. 6.
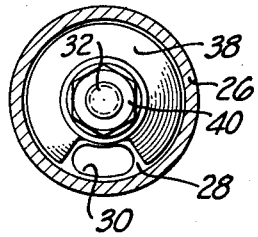
FIG. 7.
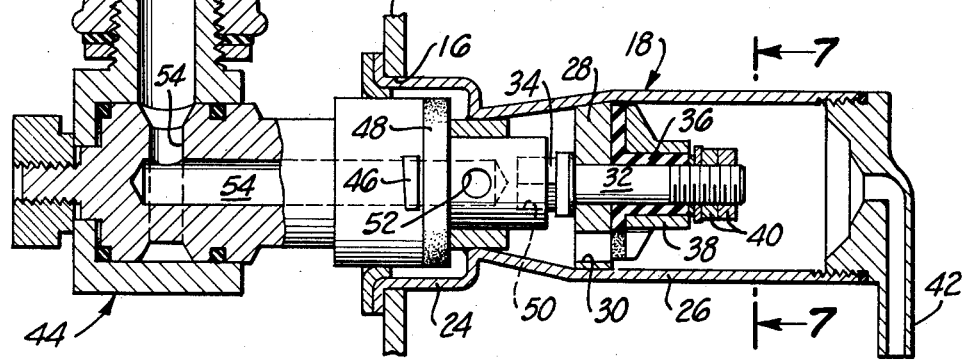
INVENTORS
WILLIAM B. FLYNN
BY
EDWARD D. O'BRIAN
ATTORNEY

3,150,799
BEER DISPENSERS
William B. Flynn, 242 Wilkin Way, Anaheim, Calif.
Filed June 4, 1962, Ser. No. 199,762
3 Claims. (Cl. 222—52)

This invention pertains to new and improved beer dispensers.

To many individuals the flavor of the beverage beer is of extreme importance and to many individuals beer which has been packaged for consumption in comparatively small containers such as, for example, glass bottles or cans, does not have as desirable a flavor as the beverage beer which has been packaged by a brewery in comparatively large containers of the type commonly referred to as kegs or barrels. For a complete understanding of this invention it is not considered necessary to go into the reasons why many persons prefer the flavor of beer which is sold in kegs or barrels to the flavor of beer which has been sold in cans or glass bottles.

As a consequence of this flavor problem many efforts have been made to provide suitable equipment so that an individual home owner can maintain a keg or barrel of beer "on tap" ready for consumption within his or her household. Because of the size of such containers such equipment must be comparatively large and of such a nature as to not fit readily into the average domestic premises. Further, such equipment is relatively expensive. For these and other reasons equipment for maintaining quantities of the beverage beer in a keg or barrel in a home or apartment has not been widely accepted.

An object of the present invention is to provide new and improved beer dispensers and containers which can be used in a normal household to maintain a bulk quantity of beverage beer so that it may be conveniently and readily dispensed and consumed. A related object of this invention is to provide beer dispensers as indicated which can be used which enables an individual who consumes beer to enjoy this beverage at its fullest without the flavor difficulties which are found whenever this beverage is packed in comparatively small containers such as glass bottles, cans or the like, which flavor is identical to the flavor achieved whenever this beverage is packaged in a comparatively large container such as a keg or barrel. Another object of this invention is to provide beer dispensers as indicated which may be constructed at a comparatively nominal cost, and which can be utilized with a minimum of difficulty in order to enable the beverage beer to be dispensed virtually whenever and wherever desired with a minimum of difficulty.

These and various other objects as well as many advantages of this invention will be more fully apparent from a detailed consideration of the remainder of this specification including the appended claims and the accompanying drawings in which:

FIG. 1 is a side elevational view showing a beer dispenser of the present invention in a protective, insulated type case ready to be transported to wherever the beverage beer may be desired;

FIG. 2 is a front perspective view showing an end of the beer dispenser illustrated in FIG. 1;

FIG. 3 is a similar front perspective view of this same beer dispenser utilized with a different type of faucet than is shown in the preceding figures, this faucet being oriented so that the dispenser can be employed in a vertical position in a refrigerator or the like;

FIG. 4 is a view similar to FIG. 3 showing the faucet oriented in a different manner so as to enable the dispenser to be utilized in a different manner in a refrigerator;

FIG. 5 is a cross-sectional view taken at line 5–5 of FIG. 2;

FIG. 6 is a cross-sectional view taken at line 6–6 of FIG. 3; and

FIG. 7 is a cross-sectional view taken at line 7–7 of FIG. 6.

The accompanying drawings are primarily intended so as to clearly illustrate a presently preferred embodiment or form of this invention. From a careful consideration of the remainder of this specification and of these drawings it will be realized that various changes within the scope of routine engineering variation may be made in the precise structure shown and described without departing from the principles or features of this invention set forth in the appended claims forming a part of this disclosure.

As an aid to understanding this invention it can be stated in essentially summary form that it concerns beer dispensers, each of which includes: a generally rectilinear box-like container of such dimension that it is adapted to fit within a household refrigerator in either an upright or horizontal position, attaching valves secured to two corners of one end of this container which are located so as to be spaced from one another at opposite sides of the container; regulator means attached to one of these valves, the regulator means including pressure control means and means for supplying carbon dioxide to the interior of the container; and discharge faucet means for discharging the beverage beer attached to the other of the valves. With the present invention a variety of different known discharge faucet means can be employed, and the orientation of these discharge faucets may be changed from time to time depending upon the desired use of the beer dispenser and the manner in which it is to be stored or held.

The present invention is best more fully described by referring directly to the accompanying drawings. Here there is shown a beer dispenser of the present invention which includes a rectilinear box-like container or tank 12 having an end 14 which is formed so as to have openings 16 located at corners of this end 14 which are remote from one another. The tank 12 holds two valves 18 which are secured to the end 14 as as to close off the opening 16 as hereinafter described. These valves 18 are adapted to be used with a regulator means 20 employed with the present invention and with a faucet means 22.

Each of the valves 18 includes a generally cup-shaped outer section 24 which leads to a lower housing 26. Within each of the housings 26 there is employed a holding plate 28 having at least one aperture 30 formed in it. A bolt 32 is rotatably mounted in each of the valves 18 upon the corresponding holding plate 28 and this bolt is provided with a non-round head 34 generally facing the cup-shaped section 24. An appropriate elastomeric sealing member 36 is located on the side of the holding plate 28 remote from the head 34 so as to be capable of being rotated in order to cover the aperture 30. Preferably this member 36 is "backed up" by means of a reinforcing member 38, and both the member 36 and the reinforcing member 38 are held in place with respect to the bolt 32 by means of nuts 40. Also preferably each of the valves 18 includes a tube 42 leading into the interior of the housing 26, and preferably these tubes 42 are oriented so as to point in opposite directions from one another toward the corners of the tank 12.

With this type of construction either the regulator means 20 or the faucet means 22 may be secured to either of the valves 18 in the manner indicated in FIG. 6 of the drawings. When the faucet means 22 is to be secured in place a base 44 on it is moved into the interior of a cup-shaped section 24 and twisted so as to wedge cam shaped ridges 46 into corresponding grooves located in the sides of this cup-shaped section 24, in order to achieve a bayonet type of locking action. As such a locking action is achieved an elastomeric washer 48 on the base 44 is rammed against the bottom of the cup-shaped section 24 so as to form a seal therewith and simultaneously a non-round cavity 50 in the base 44 engages the head 34 so as to twist the bolt 32 in order to cause the corresponding aperture 30 to be uncovered. When this aperture 30 is uncovered material can move through openings 52 in the base 44 and thence through passages 54 in the interior of this base.

Normally, material moving through the passages 54 moves as shown into the interior of a faucet housing 56 which is rotatably mounted upon the base 44. This faucet housing 56 contains a valve seat 58 which is travered by a rod 60 holding an elastomeric valve body 62. This rod 60 also traverses another internal opening 64 into a terminal cavity 66. The extremity of the rod 60 carries a small handle 68 and a coil spring 69 disposed around it in engagement with the handle 68 so as to normally bias the valve body 62 to a closed position. Thus, with this construction when the handle 68 is depressed material can flow through the entire interior of the faucet means 22 out through a spout 70 carried by the faucet housing 56 which is in communication with an internal cavity 72 directly above the valve seat 58.

If desired the valve means 22 employed with the present invention can be constructed so as to also include a flexible tube 74 which is directly connected to the base 44 by threads and a transparent tubular section 76 carried by the tube 74, this tubular section 76 directly carrying the faucet housing 56 as indicated in FIGS. 1 and 2 of the drawing. It is also possible to add to the faucet means 22 a pivotally mounted handle 78 which, when pivoted, bears against the handle 68 so as to open this entire faucet means 22.

With a beer dispenser 10 the regulator means 20 includes a base 80 which is substantially identical to the base 44 previously described and which is adapted to be used in conjunction with either of the valves 18 in the same manner in which a base such as the base 44 is used. For convenience of designation various parts of this base 80 are not separately described herein and are designated by the numerals previously employed to designate such parts.

The regulator means 20 carries a cylinder 82 having a passage 84 formed in its wall leading from the passage 54 in the base 80 to the end of this cylinder 82 remote from the base 80. This passage 84 is sealed off from the principal portion of the cylinder 82 by means of a flexible diaphragm 86 which is mounted so as to extend across the cylinder 82. This diaphragm 86 bears against a small valve pin 88 carried within an aperture 90 in a bushing 92 threaded within a bore 94 leading from the cylinder 82. This bushing 92 has a tapered shoulder 96 extending completely around the bore 90 on the side of the bushing 92 remote from the cylinder 82. The pin 88 carries a tapered head 98 serving as a valve body which is capable to fit against the shoulder 96 in order to form a seal between the head 98 and a shoulder 96.

A small coil spring 100 is located within the bore 94 between a porous filter 102 located in the base of this bore 94 and the head 98. This spring 100 normally tends to bias the head 98 against the shoulder 96. On the side of the filter 102 remote from the cylinder 82 there is mounted a small, sharp plug 104 having a groove 106 in its side. The extremity of the cylinder 82 remove from the base 80 of the regulator means 20 carries a housing 108 which is secured in place by means of threads 110 and which is sealed with respect to the cylinder 82 by means of a conventional O-ring seal 112. This housing 108 is adapted to contain a carbon dioxide cylinder 114 of conventional design and to hold this cylinder so that as the housing 108 is tightened upon the cylinder 82 it is punctured by means of the plug 104.

The regulator means 20 also includes a small safety disk 116 located within a cavity 118 in communication with the interior of the cylinder 82 on the same side of the diaphragm 86 as the valve pin 88. In the base 80 of the regulator means 20 there is also located a threaded shaft 120 which bears against a coil spring 122 which in turn bears against the diaphragm 86 in such a manner that when the position of the shaft 120 is varied as through the use of a conventional screw driver (not shown) the pressure upon the diaphragm 86 can be varied. Also a pressure relief passage 124 leading through the base 80 of the regulator means 20 may lead into the interior of the space occupied by the spring 122.

The dispenser 10 need not be handled and shipped as a complete unit. It is considered that tanks such as a tank 12 will normally be supplied to a customer by an appropriate brewery or the like so that a customer may separately utilize the regulating means 20 and a faucet means 22 whenever it is desired to consume the contents of this tank 12. Because of the spacing of the ridges 46 with respect to the grooves 47 in the cup-shaped sections 24 the particular regulating means 20 and the faucet means 22 may be installed within a tank such as the tank 12 in different orientations as indicated in FIGS. 2 and 3 and 4 of the drawings for use in either vertical or horizontal positions within an appropriate case such as a refrigerator.

Further, when a faucet means 22 as indicated in FIG. 2 of the drawing is used, the entire tank 12 may be carried about in an insulated carrying case 126 as indicated in FIG. 1 through the use of handles 128 attached to this carrying case. In this latter eventuality the faucet means 22 will project out from the carrying case 126 sufficiently far so that an appropriate receptacle (not shown) can be filled with beer whenever desired with a minimum of difficulty. With the particular regulator means 20 herein shown and described the pressure of the carbon dioxide upon the interior of a tank 22 may be varied as required by merely adjusting the postion of the threaded shaft 120 so as to appropriately regulate the position of the valve pin 88 with respect to the plug 104. Whenever desired, of course, a new cartridge or cylinder 114 of carbon dioxide may be inserted in the location shown. The orientation of the tubes 42 is considered to be important in enabling the contents of the tank 12 to be substantially exhausted.

From a careful consideration of the foregoing those skilled in the art will realize the beer dispensers such as a beer dispenser 10 are very simple, effective devices which meet a very definite, decided need for devices for dispensing so-called "tap" beer in homes, on picnics or the like. They will also realize that beer dispensers such as the beer dispenser 10 herein shown and described may be easily and conveniently manufactured at a comparatively nominal cost. Because of the nature of this invention it is to be considered as being limited solely by the appended claims forming a part of this disclosure.

I claim:

1. A beer dispenser which includes:
    a rectilinear box like container for beer having a flat end defining the interior and exterior thereof;
    separate valve means mounted on said end and leading into the interior of said container adjacent to opposite corners of said end, a valve located interiorly of said container in each of said valve means, each of said valves including rotatable valve structure for opening and closing said valve, said rotatable structure being rotatable by means mounted within said valve means and extending exteriorly of said container, said means mounted upon said valve means, said valves being openable only while said means is mounted upon said valve means;
    said means secured to one of said valve means including faucet means for use in dispensing beer, said faucet means being bayonet mounted within said valve means, said bayonet mounting means being independent of and co-axial with said valve rotating structure;

said means attached to the other of said valve means including pressure regulator means for use in supplying carbon dioxide to the interior of said container.

2. A beverage dispenser as defined in claim 1 wherein said pressure regulator means for use in supplying carbon dioxide includes a diaphragm having two sides, one side of said diaphragm carrying a spring having adjustment exterior to said pressure regulator means, the other side of said diaphragm having communication through said means and through said one of said dispensing valve means to the interior of said container, said diaphragm controlling a further valve which controls flow of carbon dioxide into said container.

3. A beverage dispenser which includes:

a rectilinear box-like container for beverage having a flat end defining the interior and the exterior thereof;

separate dispensing valve means mounted on said end and leading into the interior of said container adjacent to opposite corners of said end, a valve in each of said dispensing valve means, said valves being located interiorly of said container, said interiorly mounted valves including rotatable valve structure for opening and closing said valves, means mounted within said dispensing valve means and extending exteriorly of said container, said means being mounted upon said valve means, said valves being openable only while said means is mounted upon said valve means;

faucet means comprising one of said means extending exteriorly of said container for use in dispensing beverage secured to one of said dispensing valve means, said faucet means further comprising valve operating means engageable with said rotatable valve structure for opening and closing said valve;

pressure regulator means comprising said other means extending exteriorly of said container secured to the other one of said dispensing valve means, said pressure regulator means being attachable to said dispensing valve means by means of bayonet mounting means in said valve means independent of and coaxial with said rotary valve structure, said pressure regulator having a base, said base having bayonet means engageable with said bayonet means within said valve means, and having valve operating means engageable with said rotatable valve structure for opening and closing said valve, said bayonet means and said valve operating means being of such configuration that said bayonet locks within said valve before said dispensing valve is opened;

a pressure regulator secured to said base exteriorly of said container, said pressure regulator comprising a diaphragm having two sides, a spring in said regulator and in engagement with one side of said diaphragm, said one side of said diaphragm being in communication with the exterior of said regulator, a pressure regulator valve on the other side of said diaphragm and in engagement therewith, said other side of said diaphragm having communication through said pressure regulator through said base and through said rotary dispensing valve means to the interior of said container, said pressure regulator valve being operated by said engagement with said diaphragm so that upon a decrease in pressure in said container, said pressure regulator valve is opened;

a housing disconnectably attached to said pressure regulator, said housing being adapted to contain and restrain a non-refillable cartridge of carbon dioxide gas, a puncturing plug mounted in said regulator and in communication with said regulator valve so that upon placing a cylinder of carbon dioxide gas in said housing, and upon placing said housing upon said pressure regulator, said puncturing plug punctures the cylinder and permits passage of carbon dioxide gas therefrom through said regulator valve to be in communication with said other side of said diaphragm.

References Cited in the file of this patent

UNITED STATES PATENTS

| | | |
|---|---|---|
| 1,173,895 | Taggart | Feb. 29, 1916 |
| 2,514,773 | Kromer | July 11, 1950 |
| 2,812,109 | Wentz | Nov. 5, 1957 |
| 2,873,051 | Hamburg et al. | Feb. 10, 1959 |
| 3,039,656 | Wentz | June 19, 1962 |